(12) United States Patent
Ishii

(10) Patent No.: US 9,667,878 B2
(45) Date of Patent: May 30, 2017

(54) IMAGE CAPTURING APPARATUS AND CONTROL METHOD FOR IMAGE CAPTURING APPARATUS

(71) Applicant: CANON KABUSHIKI KAISHA, Tokyo (JP)

(72) Inventor: Hirokazu Ishii, Chofu (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/066,938

(22) Filed: Mar. 10, 2016

(65) Prior Publication Data

US 2016/0269605 A1 Sep. 15, 2016

(30) Foreign Application Priority Data

Mar. 11, 2015 (JP) .................................. 2015-048495

(51) Int. Cl.

| | |
|---|---|
| *H04N 5/335* | (2011.01) |
| *H04N 5/235* | (2006.01) |
| *H04N 5/232* | (2006.01) |
| *H04N 5/353* | (2011.01) |
| *H04N 5/378* | (2011.01) |
| *G02B 27/14* | (2006.01) |
| *G02B 27/10* | (2006.01) |
| *G03B 13/36* | (2006.01) |

(52) U.S. Cl.
CPC ......... *H04N 5/2352* (2013.01); *G02B 27/106* (2013.01); *G02B 27/144* (2013.01); *G03B 13/36* (2013.01); *H04N 5/23212* (2013.01); *H04N 5/23293* (2013.01); *H04N 5/353* (2013.01); *H04N 5/378* (2013.01)

(58) Field of Classification Search
CPC .................................................... H04N 5/2352
USPC .......................................................... 348/297
See application file for complete search history.

(56) References Cited

U.S. PATENT DOCUMENTS

2008/0240701 A1* 10/2008 Kusaka .................... G02B 7/36
396/104

FOREIGN PATENT DOCUMENTS

JP 2000-292686 A 10/2000

* cited by examiner

*Primary Examiner* — Usman Khan
(74) *Attorney, Agent, or Firm* — Cowan, Liebowitz & Latman, P.C.

(57) ABSTRACT

An image capturing apparatus comprising: an image sensor; a selection unit that selects one of a first mode in which the electric signal output from the image sensor is not output as a visible image and a second mode in which the electric signal output from the image sensor is output as a visible image; a photometry unit that performs photometry based on an electric signal output from the image sensor; a focus detection unit that performs focus detection based on the electric signal output from the image sensor; and control unit that controls a charge accumulation period such that a minimum accumulation period is set to a first period if the first mode has been selected, and to a second period that is greater than or equal to the first period if the second mode has been selected.

10 Claims, 12 Drawing Sheets

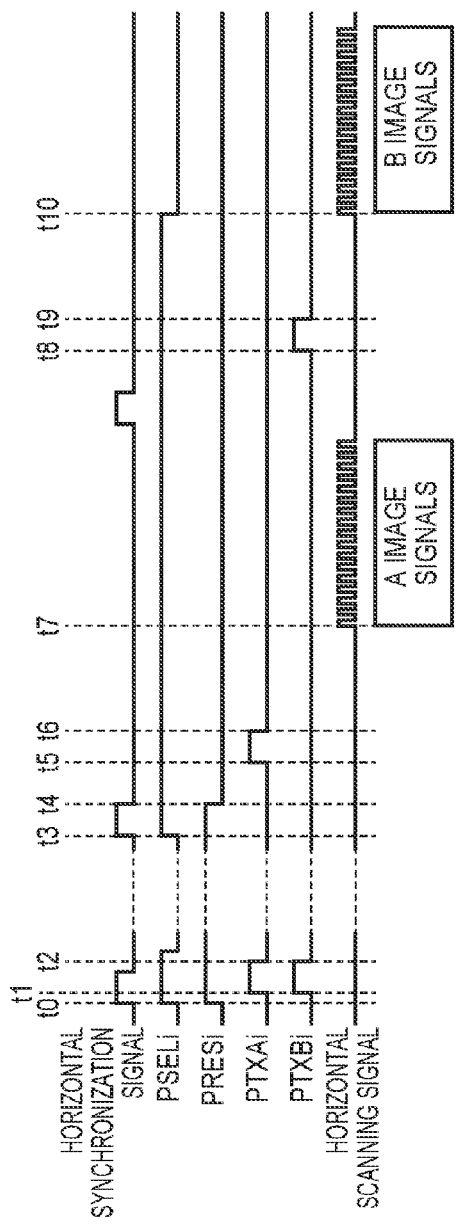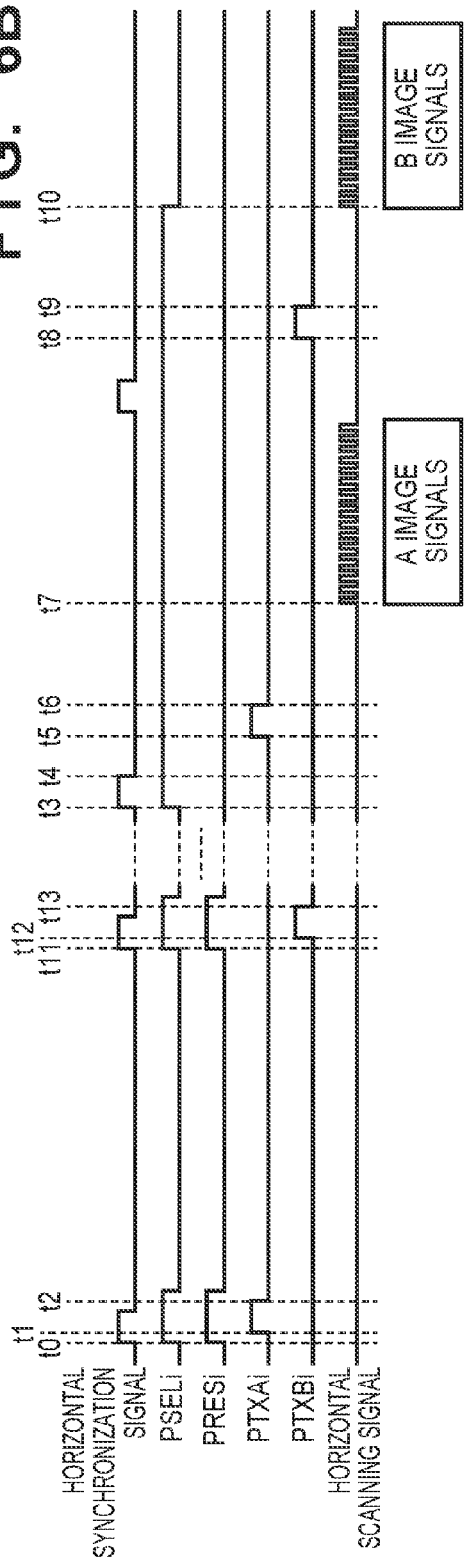

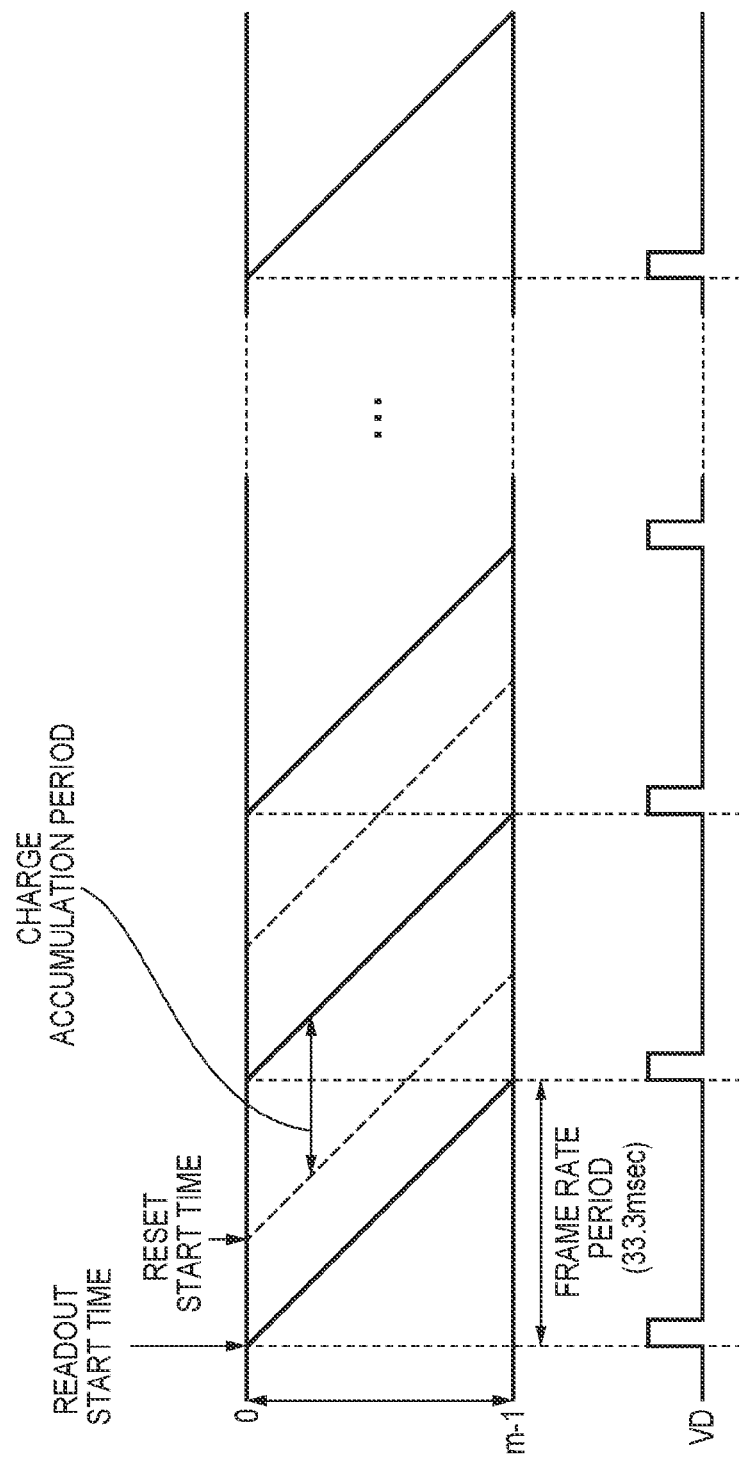

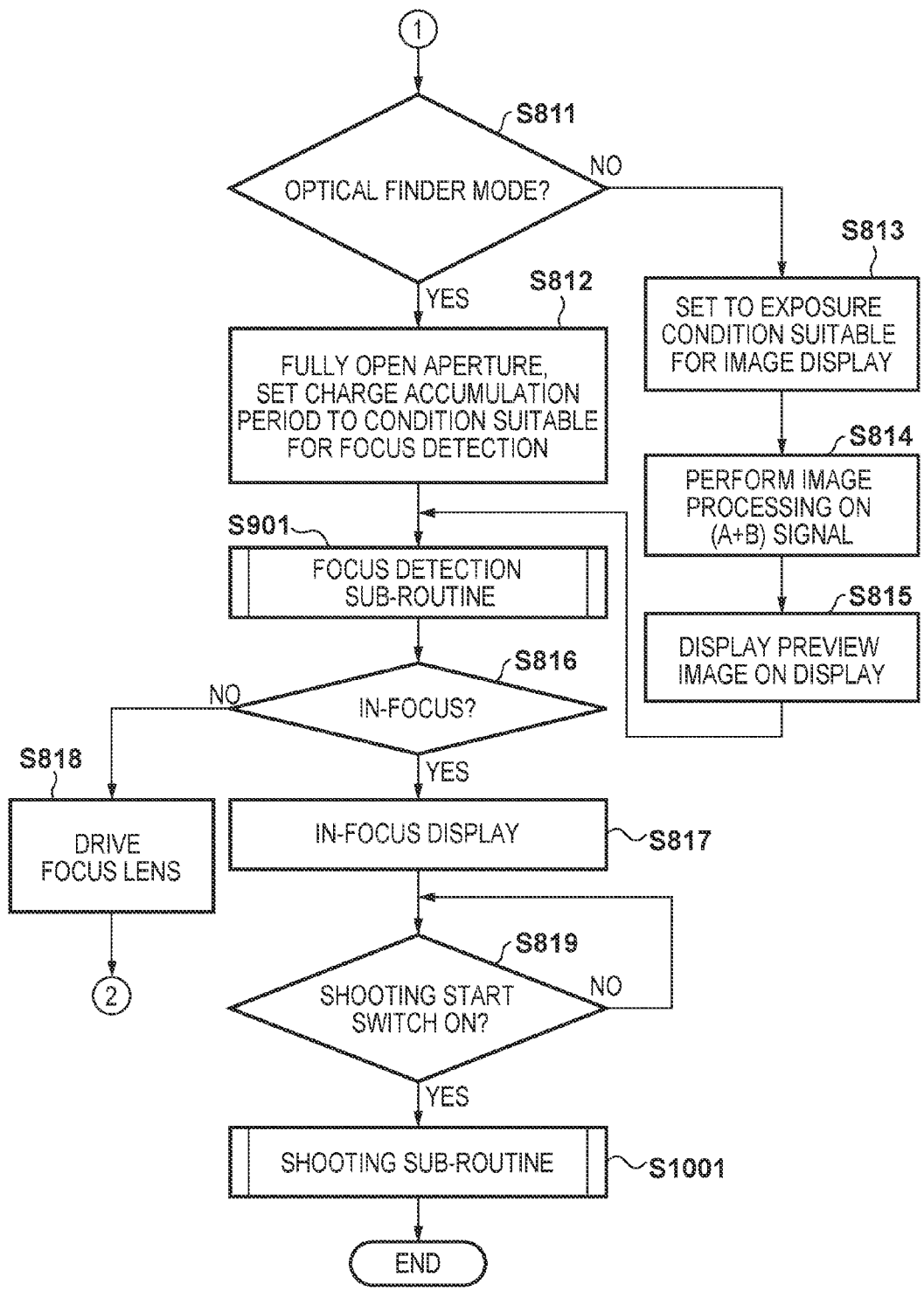

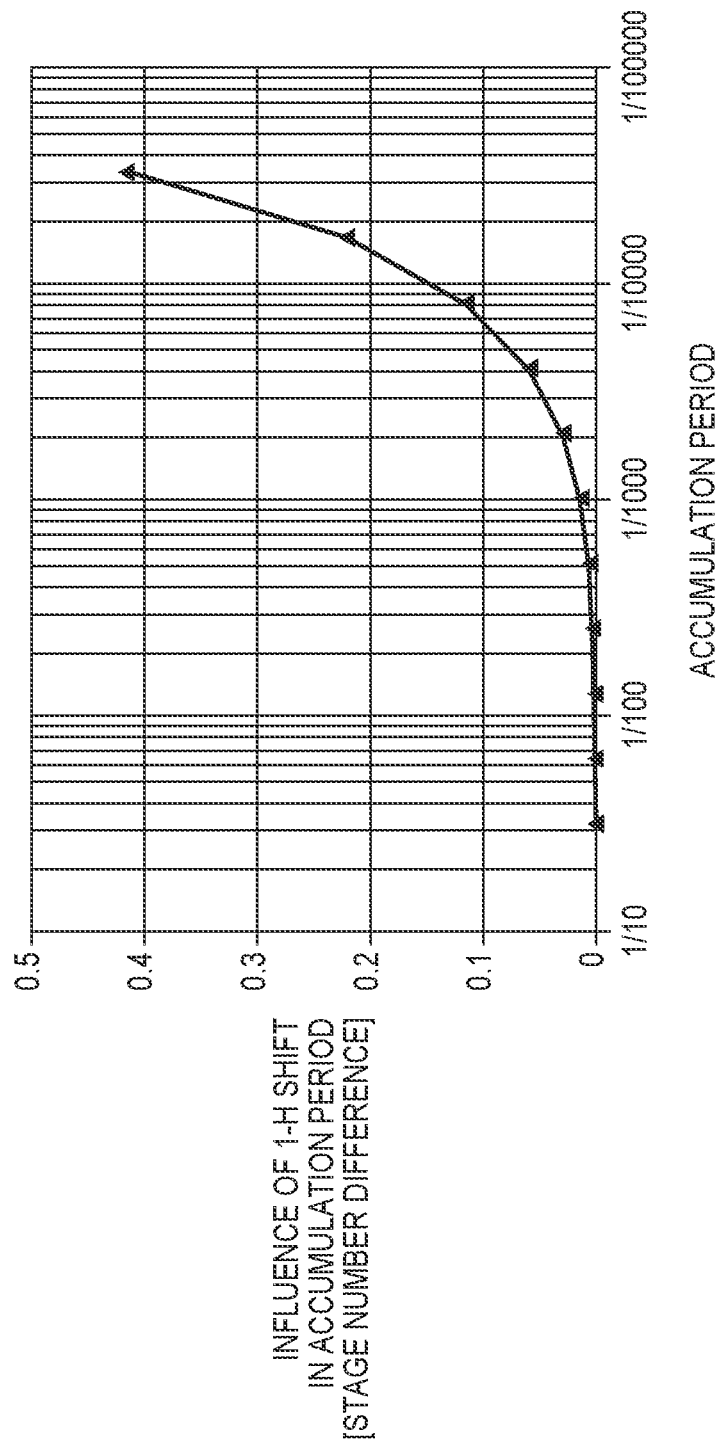

IMAGE CAPTURING APPARATUS AND CONTROL METHOD FOR IMAGE CAPTURING APPARATUS

BACKGROUND OF THE INVENTION

Field of the Invention

The present invention relates to an image capturing apparatus and a control method for an image capturing apparatus.

Description of the Related Art

Conventionally, a technique for realizing high-speed phase difference AF that eliminates the need for a dedicated AF sensor by applying a subject image phase difference detection function to pixels included in an image sensor has been disclosed. In Japanese Patent Laid-Open. No. 2000-292686, a pupil division function is applied in a portion of light, receiving elements (pixels) of an image sensor by decentering sensitive regions of light receiving portions with respect to an optical axis of one on-chip microlens. Then, by arranging these pixels as focus detection pixels at a predetermined interval between imaging pixel groups, phase difference focus detection is performed based on signals obtained from the focus detection pixels.

Note that with this kind of image capturing apparatus, the captured image generated based on the output from the imaging pixel groups is usually displayed as a through-the-lens image on a display apparatus included, on the image capturing apparatus. For this reason, with consideration given to the fact that the image is to be displayed, exposure control is performed such that the average exposure amount of the entire image is suitable.

On the other hand, Japanese Patent Laid-Open No. 2000-292686 discloses a technique in which a removable half-mirror is provided on an optical path between an imaging optical system and an image sensor and focus detection is performed based on a light flux from a subject that is incident on the image sensor via the half-mirror at the same time as monitoring via an optical finder is made possible.

When the half-mirror is inserted into the optical path between the imaging optical system and the image sensor and a subject is monitored through the optical finder, the amount of incident light from the subject is limited by only the aperture opening of the lens, and therefore the full-open state is usually maintained. For this reason, exposure control using the aperture cannot be performed, and depending on the brightness of the subject, the pixel signals become saturated relatively easily.

SUMMARY OF THE INVENTION

The present invention has been made in consideration of the above situation, and makes it possible to more suitably perform exposure control and focus detection in an image sensor including focus detection pixels.

According to the present invention, provided is an image capturing apparatus comprising: an image sensor configured to convert light incident thereon via an imaging optical system into an electric signal and output the electric signal; a control unit configured to control a charge accumulation period for the image sensor; a selection unit configured to select one of a first mode in which the electric signal output from the image sensor is not output as a visible image and a second mode in which the electric signal output from the image sensor is output as a visible image; a photometry unit configured to perform photometry based on the electric signal output from the image sensor; and a focus detection unit configured to perform focus detection based on the electric signal output from the image sensor, wherein the control unit controls the charge accumulation period with an integer multiple of a period of a horizontal synchronization signal, and if the first mode has been selected, sets a minimum accumulation period for the charge accumulation period to a first period, and if the second mode has been selected, sets the minimum accumulation period to a second period that is greater than or equal to the first period.

Further, according to the present invention, provided is a control method for an image capturing apparatus including an image sensor configured to convert light incident thereon via an imaging optical system into an electric signal and output the electric signal, the control method comprising: selecting one of a first mode in which the electric signal output from the image sensor is not output as a visible image and a second mode in which the electric signal output from the image sensor is output as a visible image; controlling a charge accumulation period for the image sensor with an integer multiple of a period of a horizontal synchronization signal, a minimum accumulation period for the charge accumulation period being set to a first period if the first mode has been selected, and the minimum accumulation period being set to a second period that is greater than or equal to the first period if the second mode has been selected; performing photometry based on the electric signal output from the image sensor; and performing focus detection based on the electric signal output from the image sensor.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 6A and 6B are timing charts showing an operation for reading out one row of charges from an image sensor according to an embodiment;

FIG. 7 is a timing chart showing an operation for reading out one image plane-worth of signals from an image sensor according to the embodiment;

FIGS. 8A and 8B illustrate a flowchart showing shooting processing of a camera according to the embodiment;

FIG. 11 is a diagram illustrating the influence that an error, between a target charge accumulation period and a charge accumulation period that can be set, has on exposure.

DESCRIPTION OF THE EMBODIMENTS

Exemplary embodiments of the present invention will be described in detail in accordance with the accompanying drawings. The dimensions, shapes and relative positions of the constituent parts shown in the embodiments should be changed as convenient depending on various conditions and on the structure of the apparatus adapted to the invention, and the invention is not limited to the embodiments described herein.

Figure 1:
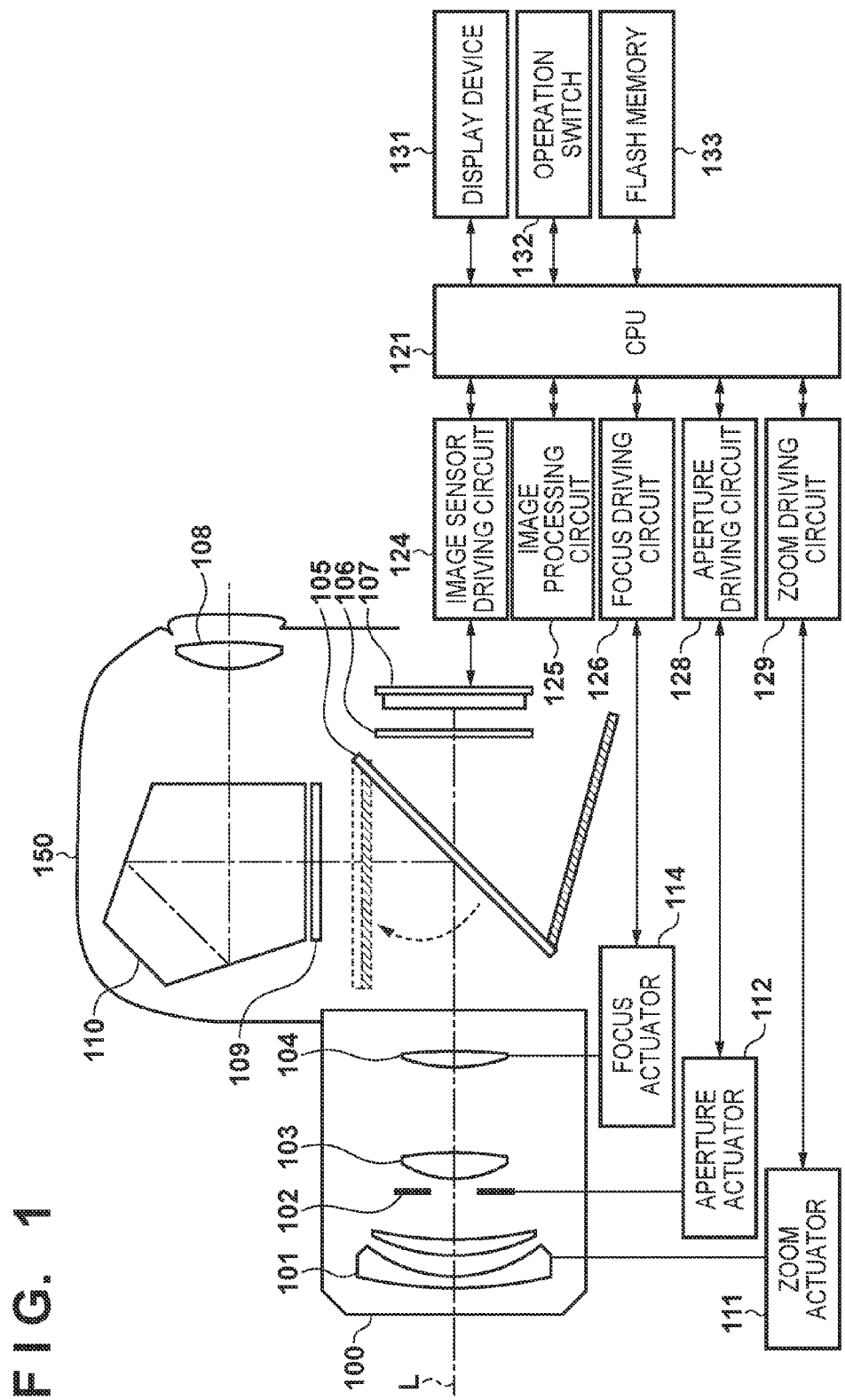
FIG. 1 is a diagram of a schematic configuration of a camera according to an embodiment of the present invention.

FIG. 1 is a diagram showing a schematic configuration of a camera as an example of an image capturing apparatus according to an embodiment of the present invention, the camera being constituted by an exchangeable imaging lens 100 and a camera body 150. The imaging lens 100 includes a first lens group 101, an aperture 102, a second lens group 103, and a third lens group 104 (imaging optical system), and is arranged on an optical axis L. The imaging lens 100 furthermore includes a driving/control system.

The first lens group 101 is arranged at the leading end of the imaging lens 100 and is held so as to be able to move forward and backward in an optical axis direction. The aperture 102 performs light amount adjustment during shooting by the opening diameter thereof being adjusted. The aperture 102 and the second lens group 103 move forward and backward in the optical axis direction as an integrated unit and realize a magnification effect (zoom function) by linking with the forward and backward movement of the first lens group 101. Also, the third lens group 104 includes a focus lens that is moved forward and backward in the optical axis direction to perform focus adjustment.

A zoom actuator 111, an aperture actuator 112, and a focus actuator 114 are included as the driving/control system. The zoom actuator 111 rotates a cam tube (not shown) so as to move from the first lens group 101 to the third lens group 103 forward and backward in the optical axis direction, and thereby performs a magnification operation. The aperture actuator 112 adjusts the image shooting light amount by controlling the aperture diameter of the aperture 102. The focus actuator 114 performs focus adjustment by moving the third lens group 104 forward and backward in the optical axis direction.

On the other hand, in the camera body 150, an optical low-pass filter, an infra-red cut filter 106 and an image sensor 107 constituted by a CMOS sensor, a peripheral circuit, and the like, are arranged in the vicinity of a planned imaging plane of the imaging lens 100. The image sensor 107 according to the present embodiment has a function for generating image signals and has a function for detecting a focus state. Note that the specific configuration of the image sensor 107 will be described later.

A half-mirror 105 formed by parallel flat glass plates or the like is arranged between the imaging lens 100 and the image sensor 107. The half mirror 105 is driven centered about a rotation axis to one of a position tilted diagonally on the optical path (solid line) and a position withdrawn from the optical path (dotted line).

The half-mirror 105 is a mirror whose entire surface has a semi-transmissive property, and when arranged at the solid line position on the optical path, the light flux passing through the imaging lens 100 is divided into reflected light that is guided to an optical finder (optical member) located above and transmitted light that is incident on the image sensor 107. The light reflected by the half-mirror 105 forms an image on a diffusion surface of a focusing plate 109 that includes the diffusion surface and a Fresnel surface and constitutes the optical finder, and the light is guided to an eye of a photographer via a pentaprism 110 and an eyepiece optical system 108. On the other hand, the transmitted light is received by the image sensor 107, and an electric signal generated in accordance with the received light is made into an image signal via AD conversion, an image processing unit, and the like.

On the other hand, when the half-mirror 105 is arranged at the dotted line position withdrawn from the optical path, the light flux that has passed through the imaging lens 100 is guided as-is to the image sensor 107 and forms an image on the light receiving surface of the image sensor 107. The electric signal generated in accordance with the light received by the image sensor 107 is made into an image signal via AD conversion, an image processing unit, and the like, and is used for storage and display.

The CPU 121 performs various types of control of the camera body 150 and includes a calculation unit, a ROM, a RAM, a D/A converter, a communication interface circuit, and the like. Based on a predetermined program stored in the ROM, the CPU 121 drives the various circuits included in the camera body 150 and executes a series of operations for AF, shooting, image processing, storage, and the like.

The image sensor driving circuit 124 controls the image capture operation of the image sensor 107, performs A/D conversion on acquired electric signals, and transmits the resulting signals to the CPU 121. The image processing circuit 125 performs processing such as γ conversion, color interpolation, and JPEG compression on the image signals acquired from the image sensor 107 via the CPU 121.

The focus driving circuit 126 performs driving control on the focus actuator 114 of the imaging lens 100 so as to cause the third lens group 104 to move forward and backward in the optical axis direction, and thereby performs focus adjustment. The aperture driving circuit 128 controls the opening of the aperture 102 by subjecting the aperture actuator 112 to driving control. The zoom driving circuit 129 drives the zoom actuator 111 in accordance with a zoom operation performed by the photographer so as to cause the first lens group 101 to move forward and backward in the optical axis direction, and thereby performs a zoom operation.

A display device 131 including liquid crystal or the like is installed on the camera rear surface and is used to display information relating to the shooting mode of the camera, a pre-shoot preview image, a post-shoot confirmation image, a focus state display image during focus detection, and the like. The operation switch 132 includes a power supply switch, a release (shooting trigger) switch, a zoom operation switch, a shooting mode selection switch, a subject observation mode selection switch, and the like. By operating the subject observation mode selection switch, it is possible to select an optical finder mode in which the optical finder is used to monitor the subject, and an electronic finder mode in which the display device 131 installed on the camera rear surface is used. Selection of the observation mode is connected with the position of the half-mirror 105, such that the half-mirror 105 is inserted at the solid line position on the optical path in the optical finder mode, and the half-mirror 105 is withdrawn to the dotted line position in the electronic finder mode. Reference numeral 133 indicates a storage medium such as a detachable flash memory that stores a shot image.

Figure 2:
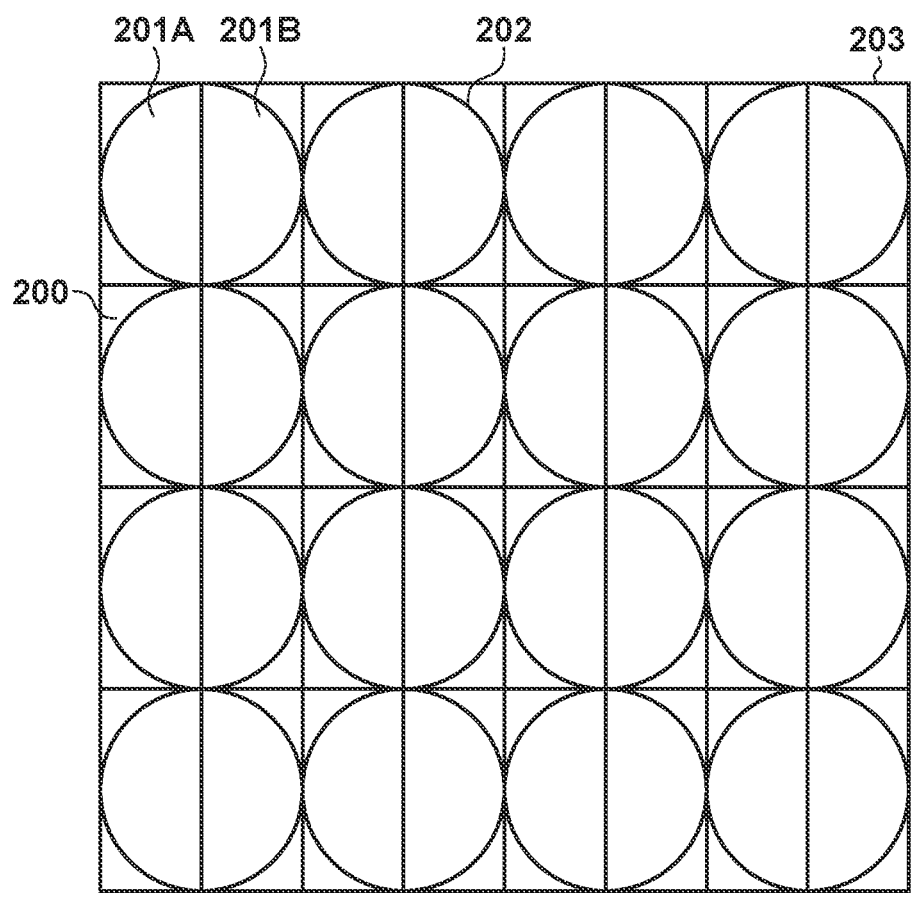
FIG. 2 is a schematic diagram showing an arrangement of pixels in an image sensor according to the embodiment.

FIG. 2 is a schematic diagram showing an arrangement of pixels in a pixel portion 203 in the image sensor 107. In the present embodiment, a microlens 202 included in a microlens array and multiple photoelectric conversion units 201A and 201B arranged with respect to the microlens 202 are used as one unit pixel 200, and FIG. 2 shows unit pixels 200 in a 4-column by 4-row range. In the present embodiment, the photoelectric conversion units 201A and 201B are described as having a configuration in which the unit pixel 200 is divided into two in an X axis direction, but it is possible to use a configuration of being divided in a Y axis direction, or to use a configuration in which unit pixels divided in the X axis direction and unit pixels divided in the Y axis direction are used in combination. Furthermore, it is possible to use a configuration of being divided in both the X axis direction and the Y axis direction, and the division number is not limited to being 2. Also, in the present embodiment, it is assumed that the photoelectric conversion units 201A and 201B are constituted by photodiodes, and it is assumed that on-chip primary-color color mosaic filters in a Bayer arrangement are formed in each unit pixel 200. Also, in the present embodiment, all of the pixels included in the pixel portion 203 are constituted by unit pixels 200, which can be used as focus detection pixels, but the present invention is not limited to this, and a portion of the pixels may be constituted by the unit pixels 200 and arranged at a predetermined interval.

Figure 3:
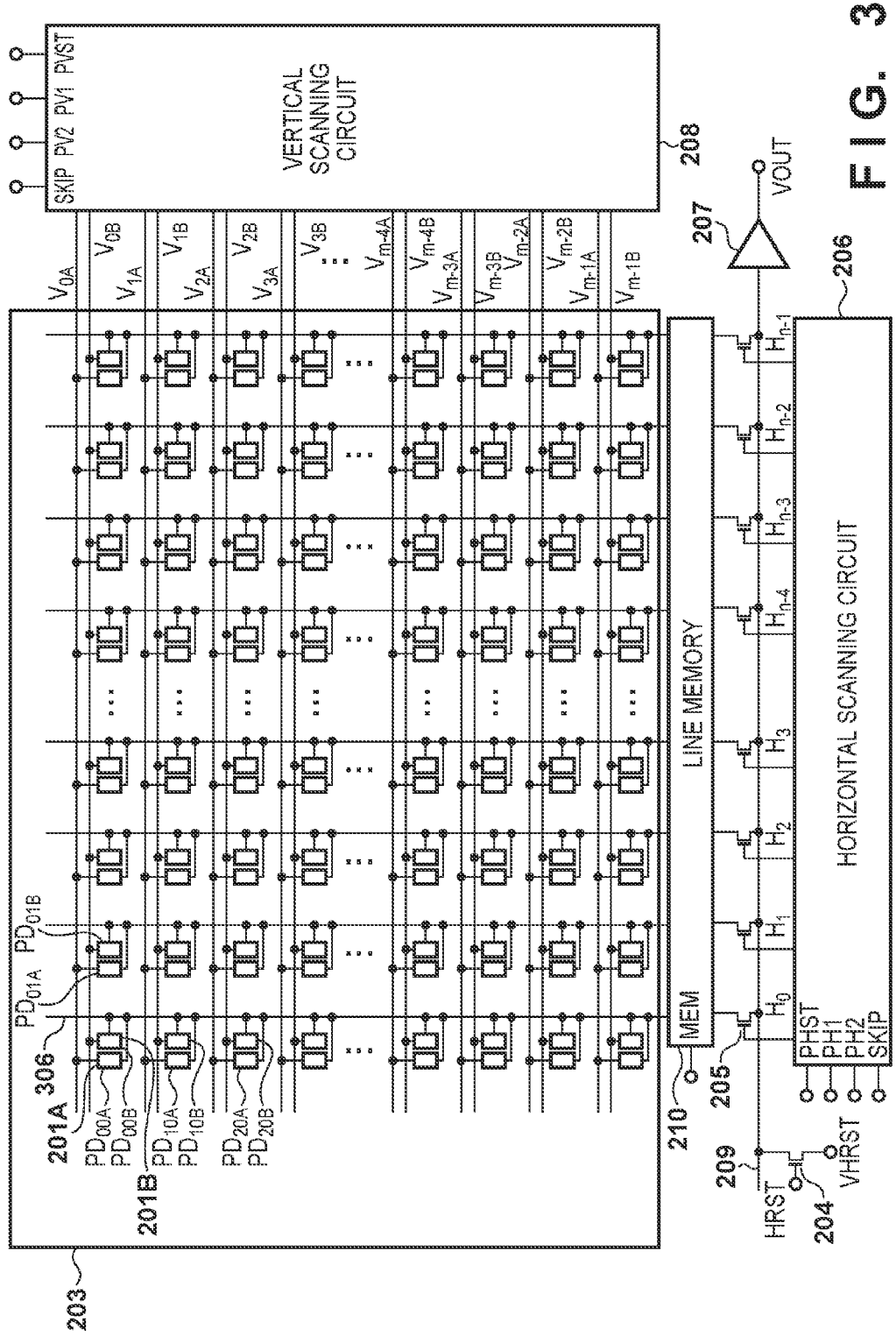
FIG. 3 is a diagram showing a schematic configuration of an image sensor according to the embodiment.

FIG. 3 is a diagram showing a schematic configuration of the image sensor 107, which includes a readout circuit. Note that FIG. 3 shows the minimum configuration according to which a later-described readout operation can be described, and does not show a pixel reset signal line and the like. As shown in FIG. 3, the pixel portion 203 in the present embodiment is configured such that the unit pixels 200 are arranged two-dimensionally, with n unit pixels 200 in the horizontal direction, and m unit pixels 200 in the vertical direction. Hereinafter, letting i be the address in the Y direction (i=0 to m−1) and letting j be the address in the X direction (j=0 to n−1), the photoelectric conversion unit 201A in the i-th row and j-th column will be indicated as PDijA, and the photoelectric conversion unit 201B in the i-th row and j-th column will be indicated as PDijB.

PDijA and PDijB are connected to a vertical output line 306 via later-described switches, and a vertical scanning circuit 208 controls the switches so that the unit pixels 200 are selected in units of rows, and the signals of the unit pixels 200 in the selected row are output to the vertical output line 306.

The vertical scanning circuit 208 can select a row to be readout by turning on switches between PDijA, PDijB, and the vertical output line 306 with signals V0 to Vm−1. A signal PVST is the data input of the vertical scanning circuit 208, signals PV1 and PV2 are shift clock inputs, and a configuration is used in which data is set when the signal PV1 is at the H level, and data is latched when the signal PV2 is at the H level. By inputting a shift clock to the signals PV1 and PV2, the signal PVST is sequentially shifted, and the switches corresponding to the signals V0 to Vm−1 can be turned on sequentially. A signal SKIP is the control terminal input for causing setting to be performed during thinning readout. By setting the signal SKIP to the H level, it is possible to cause the vertical scanning circuit 208 to skip at a predetermined interval.

A line memory 210 is a memory for temporarily storing the output from the unit pixels 200 in the selected row, and a capacitor is normally used thereas. A switch 204 is a switch for resetting a horizontal output line 209 to a predetermined potential VHRST, and is controlled with a signal HRST. The switch 205 is controlled with signals H0 to Hn−1 from the horizontal scanning circuit 206, and when the switch 205 is turned on, the output of the unit pixel 200 that is stored in the line memory 210 and corresponds to the switch 205 that was turned on is output to the horizontal output line 209. By sequentially turning on the switches 205 with the signals H0 to Hn−1, outputs are read out from one row of unit pixels.

In the horizontal scanning circuit 206, the signal PHST is the data input of the horizontal scanning circuit 206, the signals PH1 and PH2 are shift clock inputs, and a configuration is used in which data is set when the signal PH1 is at the H level and data is latched when the signal PH2 is at the H level. By inputting the shift clock to the signals PH1 and PH2, the signal PHST is sequentially shifted, whereby the switches 205 corresponding to the signals H0 to Hn−1 can be sequentially turned on. The signal SKIP is the control terminal input that causes setting to be performed during thinned readout, which will be described later. By setting the signal SKIP to the H level, it is possible to cause the horizontal scanning circuit 206 to skip at a predetermined interval.

Figure 4:
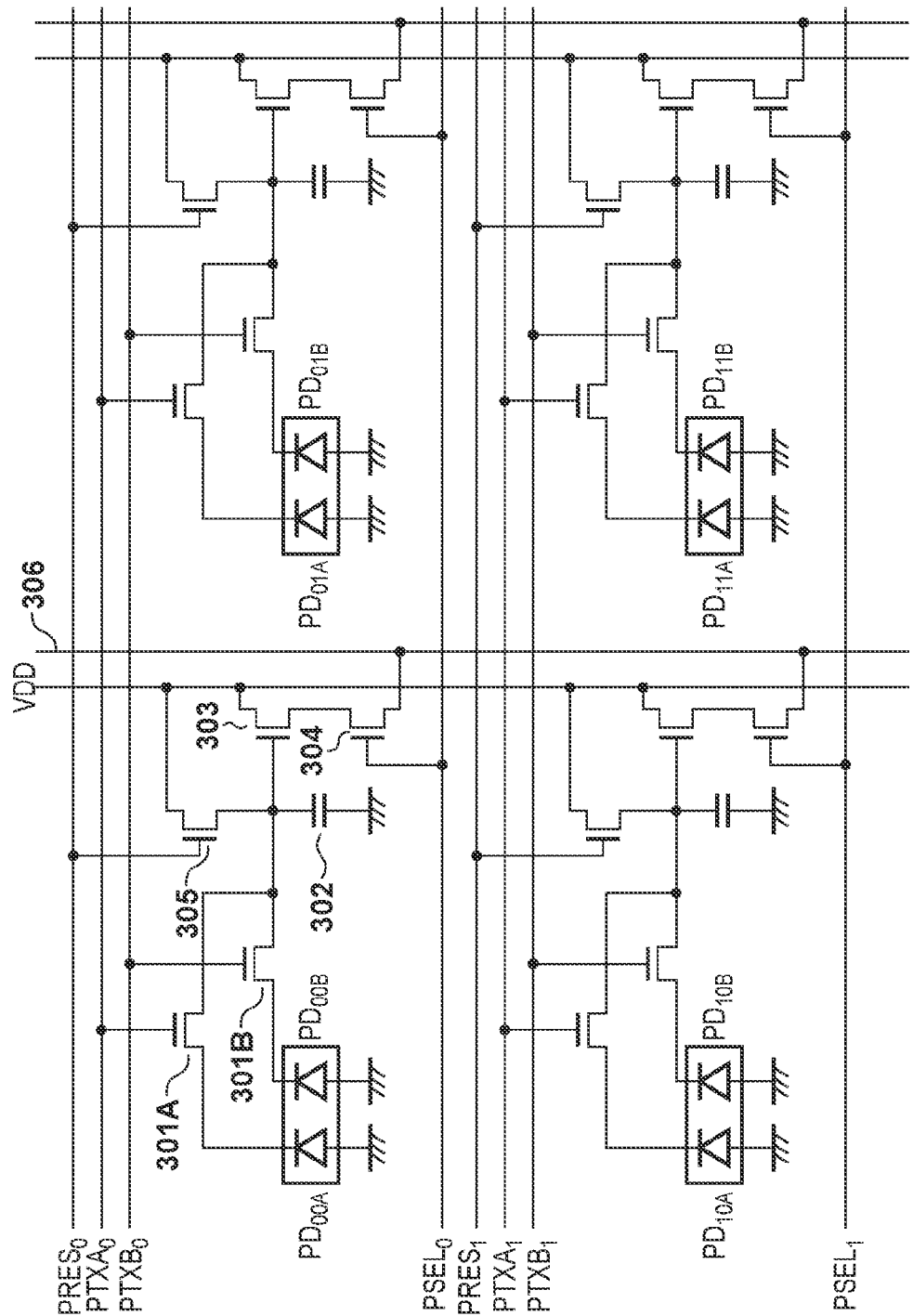
FIG. 4 is an equivalent circuit diagram of unit pixels according to the embodiment.

FIG. 4 shows an equivalent circuit diagram of unit pixels 200 of the image sensor 107, and shows two rows and two columns of unit pixels 200. Different transfer switches 301A and 301B are connected to PDijA and PDijB respectively, and the transfer switches 301A and 301B transfer charges generated by PDijA and PDijB to a shared floating diffusion portion (FD) 302. The charges transferred from PDijA and PDijB are temporarily stored in the FD 302, and the charges in the row selected by the selection switch 304 are converted into voltages and output to the vertical output lines 306 from source follower amplifiers (SFs) 303. The reset switch 305 resets the potential of the FD 302 to VDD and via the transfer switches 301A and 301B, resets the potentials of PDijA and PDijB to VDD. Note that the transfer switches 301A and 301B are controlled by transfer pulse signals PTXAi and PTXBi respectively. By controlling the transfer pulse signals PTXAi and PTXBi, it is possible to select which of the charge of PDijA and the charge of PDijB is to be transferred to the FD 302. Also, the reset switch 305 and the selection switch 304 are respectively controlled by signals PRESi and PSELi from the vertical scanning circuit 208.

Figure 5:
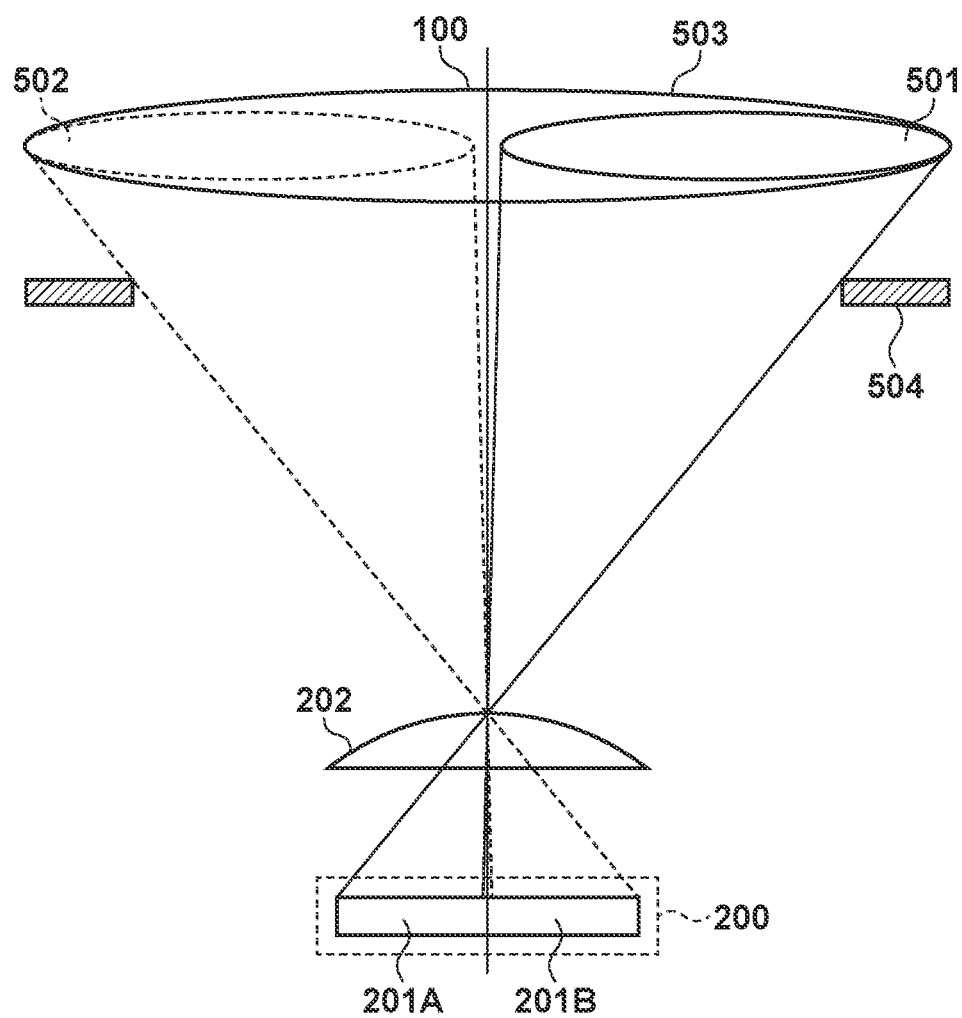
FIG. 5 is a diagram illustrating a relationship between an exit pupil plane of an imaging optical system and a photoelectric conversion unit according to the embodiment.

FIG. 5 is a diagram in which a state where light that has exited from the imaging lens 100 passes through one micro lens 202 and is received by the photoelectric conversion units 201A and 201B of the image sensor 107 is monitored in a direction orthogonal to the optical axis L. In FIG. 5, reference numeral 503 indicates an exit pupil for the entirety of the imaging lens 100, reference numerals 501 and 502 indicate pupil regions of the exit pupil of the imaging lens 100 that respectively correspond to the photoelectric conversion units 201A and 201B, and reference numeral 504 indicates a lens aperture. The light that has passed through the exit pupil 503 is incident on the unit pixels 200 centered about the optical axis L. As shown in FIG. 5, the light flux that has passed through the pupil region 501 passes through the microlens 202 and is received by the photoelectric conversion unit 201A, and the light flux that has passed through the pupil region 502 passes through the microlens 202 and is received by the photoelectric conversion unit 201B. In this way, the photoelectric conversion units 201A and 201B receive light from different regions of the exit pupil of the imaging lens 100.

Thus, the signals of the pupil-divided photoelectric conversion units 201A are obtained from the unit pixels 200 aligned in the X axis direction, and a subject image constituted by the output signal group is an "A image". Similarly, the signals of the pupil-divided photoelectric conversion units 201B are obtained from the unit pixels 200 aligned in the X axis direction, and a subject image constituted by the output signal group is a "B image". A correlation operation is carried out on the obtained A image and B image, and an image shift amount (pupil division phase difference) is detected. Then, by multiplying the detected image shift amount by a conversion coefficient determined by the focus position of the imaging lens 100 and the optical system, the position of the imaging lens 100 at which a certain object position on the screen is the focus position can be calculated. Here, controlling the third lens group 104 based on the calculated focus position information makes it possible to perform imaging plane phase difference AF.

Also, an A+B image signals obtained by adding together the A image signals and B image signals for each unit pixel 200 can be used as a normal shot image.

FIG. 6A is a timing chart showing a readout operation starting from the start of charge accumulation in one row of pixels in the image sensor 107 according to the present embodiment, and schematically shows the timing of the driving pulses and the horizontal scanning signal.

At times t0 and t1, by setting the signals PSELi, PRESi, PTXAi, and PTXBi to the H level, the potentials of the FDs 302 are reset to VDD, and via the transfer switches 301A and 301B, the potentials of PDijA and PDijB in the i-th row are reset to VDD. At time t2, the signals PTXAi and PTXBi are set to L, whereby reset is released, and charge accumulation in PDijA and PDijB is started.

Next, upon the elapse of a pre-determined charge accumulation period, a readout operation is started at time t3. Prior to the readout of signals from PDijA and PDijB, at time t3, the signal PSELi is set to the H level and the SFs 303 are switched to an operating state. At time t4, the reset of the FDs 302 is released by setting the signal PRESi to L.

Next, by setting the signal PTXAi to the H level at time t5 and to L at time t6, the photocharge accumulated in PDijA is transferred to the FD 302. Upon doing so, the potential variation of the FD 302 corresponding to the charge amount is output to the vertical output line 306. In this state, a MEM signal (not shown) is set to the H level, whereby the data of the pixels is subjected to sample holding in the line memory 210. Next, by sequentially causing the switches 205 to operate with the horizontal scanning circuit 206 starting at time t7, the signals stored in the line memory 210 are output column-by-column to the horizontal output line 209. The pixel outputs are output as VOUT via the amplifier 207 and are subjected to AD conversion by the image sensor driving circuit 124 so as to become digital data.

Similarly, by setting the signal PTXBi to the H level at time t8 and to L at time t9, the photocharge accumulated in PDijB is transferred to the FD 302. Upon doing so, the potential variation of the FD 302 corresponding to the charge amount is output to the vertical output line 306. In this state, the MEM signal (not shown) is set to the H level, whereby the data of the pixels is subjected to sample holding in the line memory 210. Next, by sequentially causing the switches 205 to operate with the horizontal scanning circuit 206 starting at time t10, the signals stored in the line memory 210 are output column-by-column to the horizontal output line 209. The pixel outputs are output as VOUT via the amplifier 207 and are subjected to AD conversion by the image sensor driving circuit 124 so as to become digital data.

Note that in the driving example shown in FIG. 6A, PDijA and PDijB that are arranged in the same row are reset at the same time, and the signal from PDijA and the signal from PDijB are read out sequentially. Accordingly, as the charge accumulation period, a difference of one pulse (1 H) of the horizontal synchronization signal occurs between PDijA and PDijB. The simultaneous reset of PDijA and PDijB is performed in order to simplify control, and by controlling the reset times of PDijA and PDijB with a shift of 1 H therebetween, it is possible to prevent the occurrence of a difference in the charge accumulation period between PDijA and PDijB.

FIG. 6B is a timing chart showing a readout operation starting from the start of charge accumulation of one row of pixels in the image sensor 107 in the case of controlling the reset times of PDijA and PDijB with a 1-H shift therebetween.

At times t0 and t1, the signals PSELi, PRESi, and PTXAi are set to H, whereby the potentials of the FDs 302 are reset to VDD and via the transfer switches 301A, the potentials of PDijA in the i-th row are reset to VDD. At time t2, PTXAi is set to L, whereby reset is released, and accumulation in PDijA is started.

Times t11 and t12 are times that are 1 H after times t0 and t1 respectively, and at times t11 and t12, the signals PSELi, PRESi, and PTXBi are set to the H level, whereby the potentials of the FDs 302 are reset to VDD and via the transfer switches 301B, the potentials of PDijB in the i-th row are reset to VDD. At time t13, PTXBi is set to L, whereby resetting is released, and charge accumulation in PDijB is started.

Since the subsequent readout operation at time t3 and onward is the same as the operation described with reference to FIG. 6A above, description thereof will not be included here. By driving the image sensor 107 in this way, it is possible to perform driving without causing the occurrence of a difference in charge accumulation periods between PDijA and PDijB.

FIG. 7 is a timing chart showing an overview of an operation for reading out one image plane-worth of signals according to the present embodiment. Note that in the present embodiment, description will be given under the assumption that the image sensor 107 is driven using the method described with reference to FIG. 6A.

As shown in FIG. 7, after the image sensor 107 is subjected to an exposure operation, the charges accumulated in PDijA and PDijB in the image sensor 107 are read out. This readout operation is performed in synchronization with a vertical synchronization signal VD and a horizontal synchronization signal HD (not shown). The vertical synchronization signal VD is a signal that defines one frame in the image capture processing, and in the embodiment, the vertical synchronization signal VD is transmitted to the image sensor 107 by the image sensor driving circuit 124 in response to a command from the CPU 121 every 1/30 of a second, for example. Also, the horizontal synchronization signal HD is a horizontal synchronization signal for the image sensor 107 and a number of pulses corresponding to the number of rows are transmitted at a predetermined interval in a period of one frame. In the present embodiment, as described with respect to FIGS. 6A and 6B, it takes a 2-H period to read out the charges from PDijA and PDijB aligned in one row, and therefore a number of pulses that is twice the number of rows are transmitted. Also, as indicated by the dotted line in the drawing, pixel resetting is performed line-by-line such that a set charge accumulation period is reached in synchronization with the horizontal synchronization signal HD.

When one frame-worth of readout ends in synchronization with the vertical synchronization signal VD and the horizontal synchronization signal HD, the vertical synchronization signal VD is transmitted once again, and readout of the next frame is started. Also, the read-out image signals are transferred to the image processing circuit 125, are subjected to image processing such as defective pixel correction, generation of an imaging signal by addition of A image signals and B image signals, and the like, and are transferred to the display device 131.

Also, in order to detect the focus state of the imaging lens 100, the A image signals and B image signals in the pre-determined focus detection region are extracted from the A image signals and the B image signals included in the image data and are transferred to a phase difference detection block (not shown) in the image processing circuit 125. In the phase difference detection block, a correlation operation is performed on the A image and the B image obtained from the pupil-divided PDijA and PDijB, and thereby a phase-difference AF evaluation value is calculated. The CPU 121 controls the focus driving circuit 126 based on the calculated phase-difference AF evaluation value so as to cause the focus actuator 114 to operate, and performs focus adjustment by controlling the third lens group 104 of the imaging lens 100. Note that the focus detection region may be a pre-determined fixed region, a region designated by the photographer, or a region that is set such that the subject is detected and the detected subject is included therein. Also, multiple focus detection regions may be set.

Also, a photometry unit including the image processing circuit 125 and the CPU 121 performs photometry and determines exposure conditions such as the charge accumulation period, gain, and aperture. The CPU 121 controls the aperture driving circuit 128 based on the determined aperture value so as to cause the aperture actuator 112 to operate, and thereby drives the aperture 102.

Next, control of the charge accumulation period will be described. In the present embodiment, the charge accumulation period is set in synchronization with the horizontal synchronization signal HD, as described above. For this reason, only a charge accumulation period that is an integer multiple of the period of the horizontal synchronization signal HD can be set, and a maximum difference of around 0.5 H appears between the setting target charge accumulation period obtained based on the photometry result, and the charge accumulation period that is set in the control. If the setting target charge accumulation period is long, the influence of the difference can be ignored, but if the charge accumulation period is short, such as 1/1000 of a second or less, the influence of the difference increases as the setting target charge accumulation period decreases.

FIG. 11 is a diagram showing the influence in the case where a difference of 0.5 H occurs in the setting target charge accumulation period when the period of the horizontal synchronization signal HD is 20 µs. The horizontal axis indicates the setting target charge accumulation period, and the vertical axis indicates the exposure change amount that occurs due to the difference of 0.5 H. Regarding the influence that a difference in exposure that occurs with a shorter charge accumulation period has on the image, it is possible to reduce the influence on the appearance of the image by applying a gain correction to the image data. However, if the charge accumulation period is extremely short, the exposure change amount caused by a difference of 0.5 H is large, and the value of the gain to be applied to the image data in order to correct the change in the exposure amount increases, and therefore the influence of the gain correction is visible. For this reason, as the minimum accumulation period that can be set, a limiting value that is greater than the minimum driving limit of the image sensor 107 is usually provided.

Also, with the image sensor 107 of the present embodiment, as described above with reference to FIG. 6A, a difference of 1 H occurs in the charge accumulation period between PDijA and PDijB that are arranged in the same row. For this reason, during image signal generation and focus detection, a pair of signal levels need to be made uniform by performing an operation of applying the gain correction value determined in accordance with the set charge accumulation period to one or both of the image signals.

Furthermore, as described above, in general, when monitoring a subject with an optical finder, the amount of incident light from the subject is restricted by only the aperture opening of the lens, and it is preferable to fully open the aperture opening so that the subject being monitored does not become dark. In contrast, in an electronic finder mode in which a subject is monitored using the display device 131, an image of the subject image received by the image sensor 107 is displayed, and therefore the exposure conditions suitable for monitoring the image can be set along with the aperture. For this reason, in the optical finder mode, PDijA and PDijB become saturated more easily when the subject is shot, compared to the electronic finder mode.

Furthermore, in the optical finder mode, since the subject is monitored through the optical finder, there is no need to display the subject on display device 131 and store the shooting data other than when shooting is performed. For this reason, there is no need to give consideration to the influence of correction on the appearance of the image as in the description above, and it is possible to use any charge accumulation period up to the minimum accumulation period at which the driving limit of the image sensor 107 is reached.

Accordingly, in the present embodiment, the minimum accumulation period that can be set changes according to the subject observation mode.

Figure 8A:
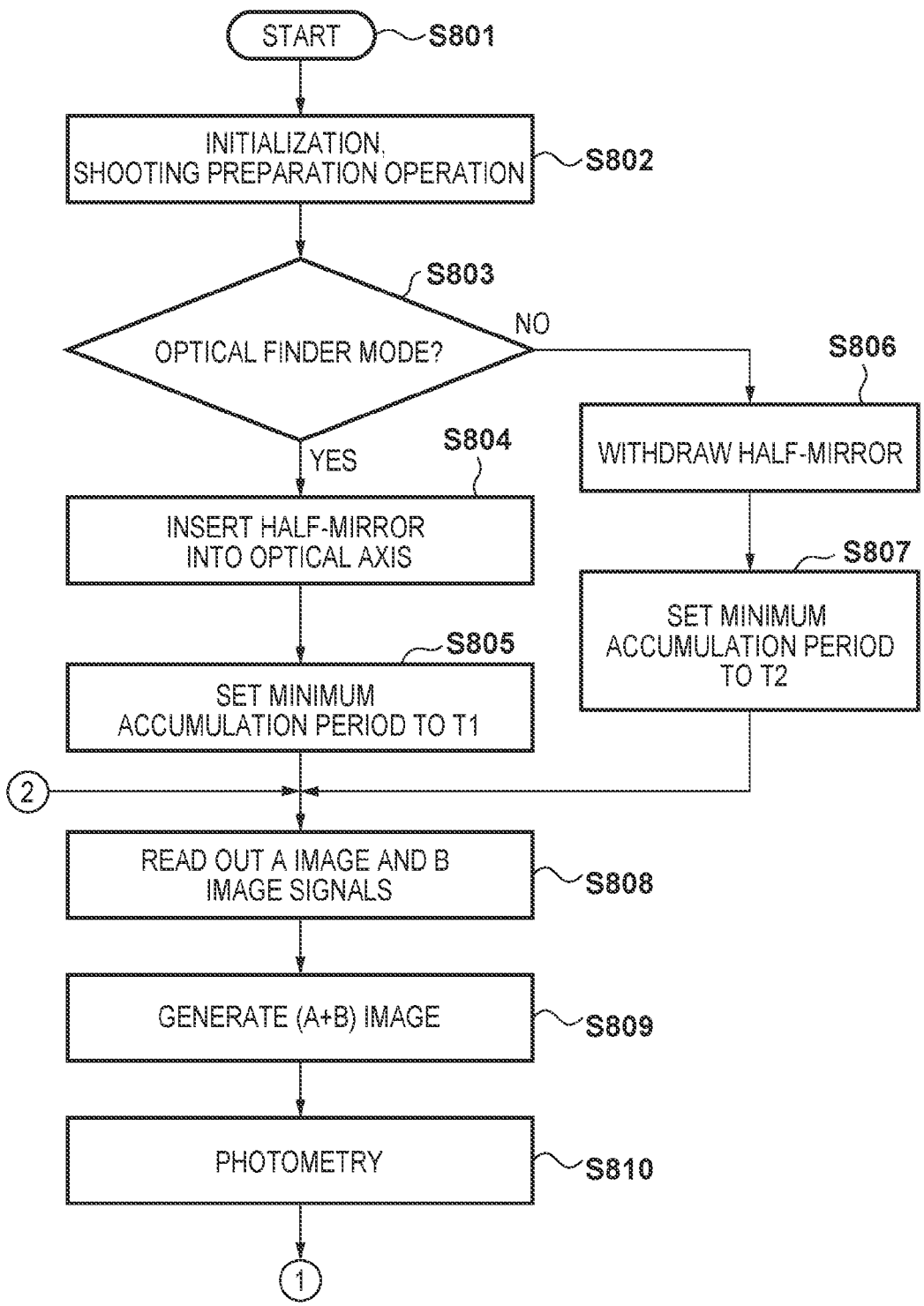

Next, operations of the present embodiment will be described, in detail with reference to FIGS. 8A to 10. FIGS. 8A and 8B illustrate a flowchart showing image shooting processing of the camera according to the present embodiment.

When the photographer turns on the power supply switch of the camera in step S801, operation is started, and in step S802, the CPU 121 performs confirmation of the operation of the actuators in the camera and the image sensor 107 and executes initialization of the memory content and execution programs, as well as shooting preparation operations.

In step S803, it is determined whether or not the optical finder mode has been selected as the observation mode using the operation switch 132. If the optical finder mode has been selected, the processing moves to step S804, and the half-mirror 105 is inserted into the optical axis L. On the other hand, if the electronic finder mode has been selected, the processing moves to step S806, and the half-mirror 105 is withdrawn from the optical axis L.

After the subject observation mode is selected and the position of the half-mirror 105 is decided, the minimum accumulation period that can be set in the observation mode is designated. In the optical finder mode, the minimum accumulation period is set to T1 in step S805, and in the electronic finder mode, the minimum accumulation period is set to T2 in step S807. Here, the relationship between the minimum accumulation periods T1 and T2 is such that T1≤T2.

Next, in step S808, the A image signals and B image signals output from the image sensor 107 are read out, and in subsequent step S809, the read-out A image signals and B image signals are subjected to addition processing for each unit pixel 200 so as to generate a shot image signal, and in step S810, photometry is performed using the shot image signal that was generated.

Next, determination of the selected observation mode is performed once again in step S811. If the optical finder mode has been selected, the processing moves to step S812, and the exposure conditions are set used on the photometry results from step S810. At this time, the aperture opening of the lens is set to the full-open state, and the exposure conditions are set by controlling the charge accumulation period with the minimum accumulation period T1 set in step S805 used as the minimum limit. Accordingly, it is possible to reduce the likelihood that the photoelectric conversion units 201A and 201B will become saturated.

On the other hand, if the electronic finder mode has been selected, the processing moves to step S813, and exposure conditions that are suitable for display on the display device 131 are set based on the photometry result calculated in step S810. At this time, the charge accumulation period is controlled using the minimum accumulation period T2 set in step S807 as the minimum limit. This makes it possible to prevent a decrease in the quality of the image displayed on the electronic finder. In the subsequent steps S814 and S815, image processing is performed on the shot image signals obtained in step S809 and a preview image is displayed on the display device 131. The photographer views this preview image to determine the composition of the image during shooting. After steps S812 and S815, the processing moves to step S901, and focus detection processing is executed.

Figure 9:
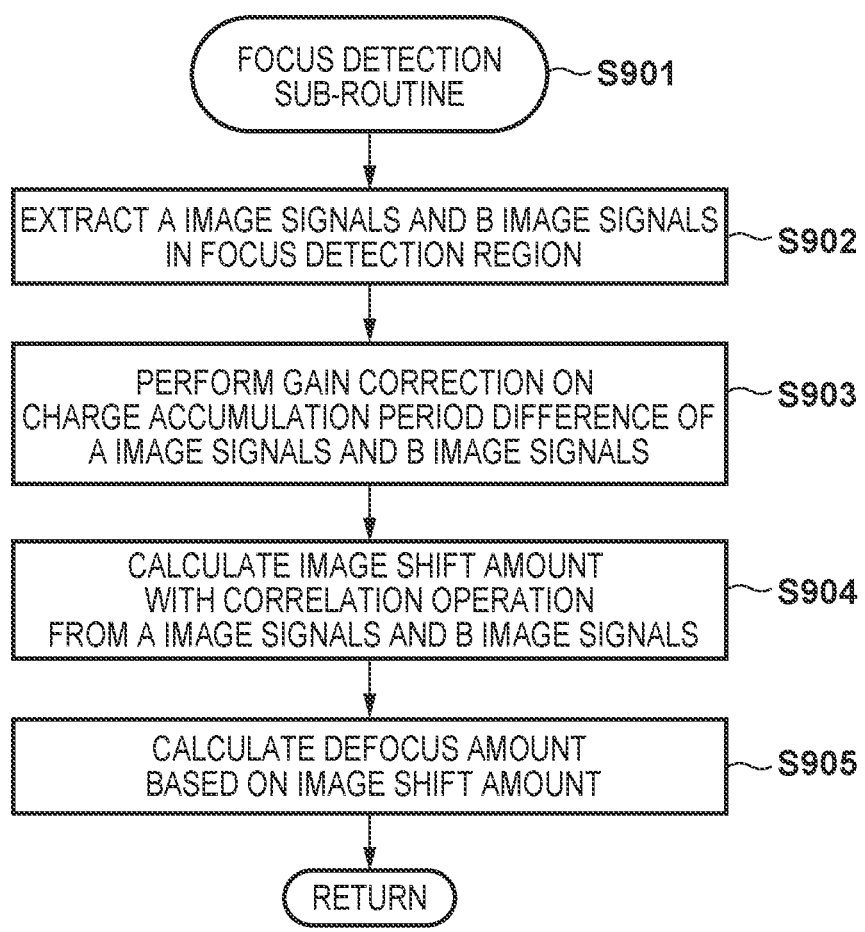
FIG. 9 is a flowchart showing focus detection processing according to the embodiment.

FIG. 9 is a flowchart showing a sub-routine for the focus detection processing performed in step S901. Upon the focus detection processing being started, in step S902, the A image signals and the B image signals (focus detection signals) obtained from PDijA and PDijB included in the pre-set focus detection region are extracted. In the subsequent step S903, gain correction for correcting the level difference that occurs due to the difference in the charge accumulation periods of the two images is performed on the obtained pairs of focus detection signals. Note that the processing in step S903 does not need to be performed if control was performed according to the timing shown in FIG. 6B. In step S904, a correlation operation is performed on the two images, and the relative position shift amount of the two images is calculated. Here, the correlation operation expressed in equation (1) is performed on pairs of focus detection signals (a1 to ap, b1 to bp, p being the number of pieces of data) that are read out from PDijA and PDijB and subjected to gain correction, and the correlative amount Corr (l) is calculated.

$$\text{Corr}(l) = \sum_{k=0}^{p-l-1} |a_k - b_{k+l}| \quad (1)$$

In equation (1), l indicates the image shift amount, and the number of pieces of data when the image is shifted is limited to p−1. Also, the image shift amount l is an integer, and is a relative shift amount in units of data string data intervals. If the calculation result of equation (1) is such that the correlation of a pair of pieces of data is the highest, the correlation amount Corr (l) is extremely small. Furthermore, using a correlation amount calculated with a correlation amount Corr (q) (extremely small shift amount q) and a shift amount close to q, and using a method of three-point interpolation, the shift amount d that provides a minimum value Corr (d) with respect to successive correlation amounts is obtained.

In the subsequent step S905, the defocus amount is calculated by multiplying a predetermined defocus conversion coefficient by the image shift amount obtained in step S904, and the processing returns to FIG. 8B.

In step S816 in FIG. 8B, it is determined whether or not the defocus amount obtained in step S905 is less than or equal to a permissible value. If the defocus amount is greater than the permissible value, it is determined that the image is not in focus, and in step S818, the third lens group 104 is driven, whereafter the processing of steps S808 to S816 is repeated. Then, in step S816, if the obtained defocus amount is less than or equal to the permissible value and it is determined that an in-focus state has been reached, in-focus display is performed in step S817, and the processing moves to step S819. In step S819, it is determined whether or not the shooting start switch has been turned on, and if it has not been turned on, a shooting standby state is maintained in step S819. If the shooting start switch is turned on in step S819, the processing moves to step S1001, and the shooting processing is executed.

Figure 10:
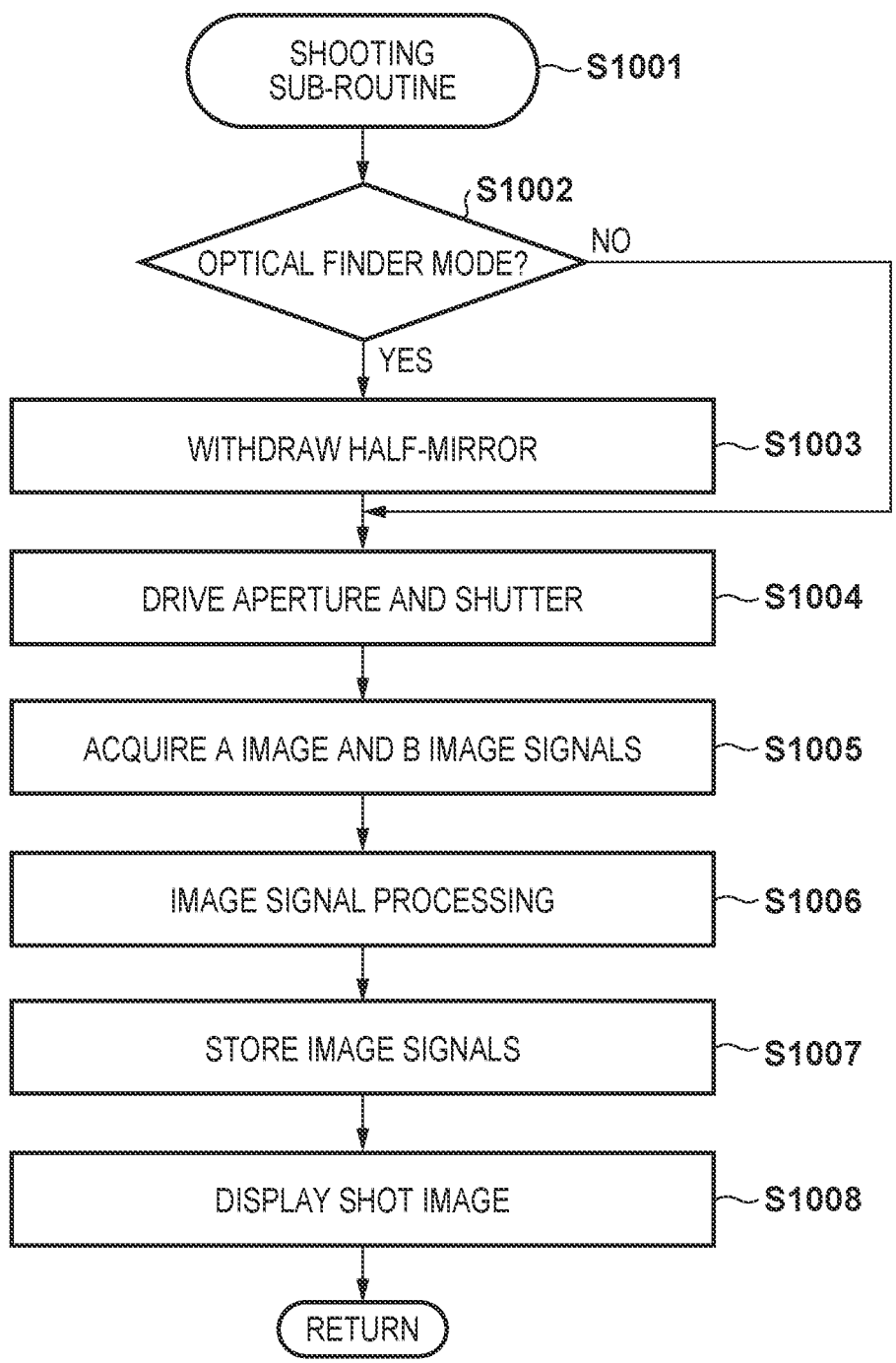
FIG. 10 is a flowchart showing image shooting processing according to the embodiment.

FIG. 10 is a flowchart showing a sub-routine for shooting processing performed in step S1001. In step S1002, determination of the selected observation mode is performed. If the optical finder mode has been selected, the processing moves to step S1003, and the half-mirror 105 is withdrawn from the optical axis L, whereafter the processing moves to step S1004. If the electronic finder mode has been selected, the half-mirror 105 has been withdrawn from the optical axis L, and therefore the processing moves directly to step S1004.

In step S1004, in order to perform still image shooting, the light amount adjustment aperture is driven and the exposure period is controlled, whereby the image sensor 107 is exposed. At this time, if the camera is provided with a mechanical shutter, opening control thereof is performed. If a mechanical shutter is not provided, the charge accumulation period is controlled using an electronic shutter. Also, the exposure period may be controlled by a combination of both the mechanical shutter and an electronic shutter.

After the image sensor 107 is exposed, the A image signals and B image signals are read out in step S1005. In step S1006, image data generation is performed by performing defective pixel interpolation on the read-out signals and performing addition processing on the A image signals and B image signals, and image processing such as γ correction and edge enhancement is also performed on the image. In step S1007, the shot image is stored in the flash memory 133, and in the subsequent step S1008, the shot image is displayed on the display device 131, the processing returns to the processing in FIG. 8B, and the series of shooting operations ends.

As described above, according to the present embodiment, by changing the minimum accumulation period during image monitoring according to the observation mode, it is possible to reduce the likelihood that the photoelectric conversion unit will become saturated, and to prevent a decrease in the quality of the image displayed on the electronic finder. Accordingly, regardless of the observation mode, it is possible to perform exposure control and focus detection more suitably.

Note that the above-described embodiment is merely a representative example, and when carrying out the present invention, the embodiment can be modified and changed in various ways.

MODIFIED EXAMPLE

In the above-described embodiment, a case was described in which the setting of the minimum accumulation period that can be set was changed according to the observation mode. However, the influence that occurs in the case where the minimum accumulation period is extremely short lies in the fact that the difference is visible in the image that is displayed or stored. For this reason, it is possible to use a configuration in which the setting of the minimum accumulation period that can be set is changed according to whether or not the observation mode is a mode in which the subject image is output as a visible image that is to be displayed or stored.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-048495, filed on Mar. 11, 2015, which is hereby incorporated by reference herein in its entirety.

What is claimed is:

1. An image capturing apparatus comprising:
   an image sensor configured to convert light incident thereon via an imaging optical system into an electric signal and output the electric signal;
   a control unit configured to control a charge accumulation period for the image sensor;
   a selection unit configured to select one of a first mode in which the electric signal output from the image sensor is not output as a visible image and a second mode in which the electric signal output from the image sensor is output as a visible image;
   a photometry unit configured to perform photometry based on the electric signal output from the image sensor; and
   a focus detection unit configured to perform focus detection based on the electric signal output from the image sensor,
   wherein the control unit controls the charge accumulation period with an integer multiple of a period of a horizontal synchronization signal, and if the first mode has been selected, sets a minimum accumulation period for the charge accumulation period to a first period, and if the second mode has been selected, sets the minimum accumulation period to a second period that is greater than or equal to the first period.

2. The image capturing apparatus according to claim 1, further comprising:
   a half-mirror configured to be driven to one of a position inserted into an optical path between the imaging optical system and the image sensor, and a position withdrawn from the optical path; and
   an optical member for monitoring light reflected by the half-mirror,
   wherein the first mode is an optical finder mode in which a subject is monitored with the optical member.

3. The image capturing apparatus according to claim 2, wherein
   the imaging optical system includes an aperture, and
   in the optical finder mode, the aperture is fully opened.

4. The image capturing apparatus according to claim 1, further comprising
   a display unit configured to display an image generated based on the electric signal output from the image sensor,
   wherein the second mode is an electronic finder mode in which the image displayed on the display unit is monitored.

5. The image capturing apparatus according to claim 1, further comprising
   a storing unit configured to generate an image signal based on the electric signal output from the image sensor and store the generated image signal in a storage medium,
   wherein the second mode is a mode in which storage is performed.

6. The image capturing apparatus according to claim 1, wherein
   the control unit controls the charge accumulation period based on a result of photometry performed by the photometry unit.

7. The image capturing apparatus according to claim 1, wherein
   the image sensor comprises focus detection pixels, having a plurality of microlenses each corresponding to a plurality of photoelectric conversion units, that output respective electric signals from the plurality of photoelectric conversion units, and
   the focus detection unit generates a pair of focus detection signals with a phase difference from the electric signals output from the plurality of photoelectric conversion units and performs focus detection based on the phase difference between the pair of focus detection signals.

8. The image capturing apparatus according to claim 7, wherein
   the control unit performs control such that charge accumulation in the plurality of photoelectric conversion units is started simultaneously in each row and electric signals are output from the plurality of photoelectric conversion units at mutually different timings, and
   the image capturing apparatus further includes a correction unit configured to correct a level difference between the output electric signals according to a difference between the charge accumulation periods that are different for each of the plurality of photoelectric conversion units.

9. The image capturing apparatus according to claim 7, wherein
   the control unit performs control such that electric signals are output from the plurality of photoelectric conversion units at mutually different timings and the charge accumulation periods for the plurality of photoelectric conversion units become equal to each other by mutually changing timings at which charge accumulation starts in the plurality of photoelectric conversion units.

10. A control method for an image capturing apparatus including an image sensor configured to convert light incident thereon via an imaging optical system into an electric signal and output the electric signal, the control method comprising:
    selecting one of a first mode in which the electric signal output from the image sensor is not output as a visible image and a second mode in which the electric signal output from the image sensor is output as a visible image;
    controlling a charge accumulation period for the image sensor with an integer multiple of a period of a horizontal synchronization signal, a minimum accumulation period for the charge accumulation period being set to a first period if the first mode has been selected, and the minimum accumulation period being set to a second period that is greater than or equal to the first period if the second mode has been selected;
    performing photometry based on the electric signal output from the image sensor; and performing focus detection based on the electric signal output from the image sensor.

* * * * *